United States Patent
Latella et al.

(10) Patent No.: US 9,083,779 B2
(45) Date of Patent: Jul. 14, 2015

(54) ELECTRONIC DEVICE WITH COLOR-CHANGING LAYER OVER OPTICAL SHUTTERING LAYER

(75) Inventors: Rick Latella, Woodstock, IL (US); Michael Leung, Stanmore (GB); Nicholas Woodley, London (GB)

(73) Assignee: Google Technology Holdings LLC, Mountain View, CA (US)

( * ) Notice: Subject to any disclaimer, the term of this patent is extended or adjusted under 35 U.S.C. 154(b) by 211 days.

(21) Appl. No.: 13/172,461

(22) Filed: Jun. 29, 2011
(Under 37 CFR 1.47)

(65) Prior Publication Data
US 2013/0002991 A1 Jan. 3, 2013

(51) Int. Cl.
G02F 1/1335 (2006.01)
H04M 1/02 (2006.01)

(52) U.S. Cl.
CPC .......... H04M 1/0266 (2013.01); H04M 1/0283 (2013.01); *G09G 2300/023* (2013.01)

(58) Field of Classification Search
None
See application file for complete search history.

(56) References Cited

U.S. PATENT DOCUMENTS

| | | | |
|---|---|---|---|
| 6,727,967 B2 | 4/2004 | Nakamura et al. | |
| 6,842,170 B1 | 1/2005 | Akins et al. | |
| 6,894,749 B2 | 5/2005 | Suzuki et al. | |
| 8,189,138 B2 | 5/2012 | Amimori et al. | |
| 8,749,735 B2 * | 6/2014 | Jang et al. | 349/106 |
| 2003/0160923 A1 * | 8/2003 | Ma | 349/115 |
| 2005/0243265 A1 | 11/2005 | Winlow et al. | |
| 2007/0220427 A1 | 9/2007 | Briancon et al. | |
| 2008/0074383 A1 | 3/2008 | Dean | |
| 2010/0216514 A1 | 8/2010 | Smoyer et al. | |
| 2011/0261303 A1 * | 10/2011 | Jang et al. | 349/108 |

FOREIGN PATENT DOCUMENTS

| | | |
|---|---|---|
| CN | 101305303 A | 11/2008 |
| EP | 1686446 A1 | 8/2006 |
| EP | 1895545 A2 | 3/2008 |
| GB | 2348039 A | 9/2000 |

OTHER PUBLICATIONS

Patent Cooperation Treaty, "PCT Search Report and Written Opinion of the International Searching Authority" for International Application No. PCT/US2012/037988, Jul. 2, 2012, 14 pages.
Office Action Response for EP Application No. 12722059.8, filed on Aug. 13, 2014, 10 pages.
Chinese Office Action and Search Report from corresponding application CN 201280031396.5, dated Mar. 18, 2015, 28 pages.

* cited by examiner

*Primary Examiner* — Tina Wong

(57) ABSTRACT

An electronic device includes a housing, an electronic display viewable from a front side of the electronic device, an optical shuttering layer substantially parallel to the front side, and a color changing layer positioned over at least a portion of the shuttering layer. A driver controls transitions of the shuttering layer between a transparent clear state and an opaque state and also transitions of the color changing layer between a transparent clear state and a colored state. Depending on driver control, the appearance of the electronic device can change from an opaque color (solid color or with graphic design elements), to a translucent color (solid color or with graphic design elements) possibly with an underlying electronic display somewhat visible, to a transparent color with an underlying electronic display clearly visible.

20 Claims, 5 Drawing Sheets

ELECTRONIC DEVICE WITH COLOR-CHANGING LAYER OVER OPTICAL SHUTTERING LAYER

FIELD OF THE INVENTION

The present invention relates to an electronic device with color changing and optical shuttering layers for changing the appearance of the device.

BACKGROUND

Portable electronic devices such as mobile phones, smart phones, personal digital assistants (PDAs), and tablets have become popular and ubiquitous. These devices typically include an electronic display screen, various user interface input components (such as touch screens, keypads, buttons, etc.), and a housing enclosing various electrical components. The color of the housing can provide aesthetic appeal, and various housing covers having different colors and different graphics designs are also often available to further personalize the device. In addition, the electronic display screen and the user interface input components can utilize white or colored backlights to enhance visibility and provide another source of aesthetic appeal.

When the electronic display screen is active (and backlight is on), the displayed graphics can be illuminated to a desired color or pattern, such as a color or pattern that matches the housing color or graphic pattern. When the electronic display screen is not active (the backlight is off or the pixels are controlled to be all dark), a black or grayish appearance is typically seen, which may not be particularly aesthetically appealing when considering the coloring of the rest of the mobile device.

Cholesteric liquid crystal (ChLC) panels have also been used to provide various color effects for electronic devices. These panels can be controlled to change along a spectrum of transparent and colored states, and generally require low power. However, they require a completely absorbing background (such as a black background) to achieve appropriate color, because without such a background, any light reflected from the panel surface will wash out the cholesteric layers, reducing contrast and color saturation. Typically, such a black background is achieved by printing or painting the underlying surface black. On an electronic device, this limits the area available for achieving cholesteric-based color effects, because such black backgrounds have not been possible over an electronic display or back lighted electronic keypad. Thus, there is an opportunity to achieve color effects over a greater area of an electronic device.

DETAILED DESCRIPTION

Figure 1:
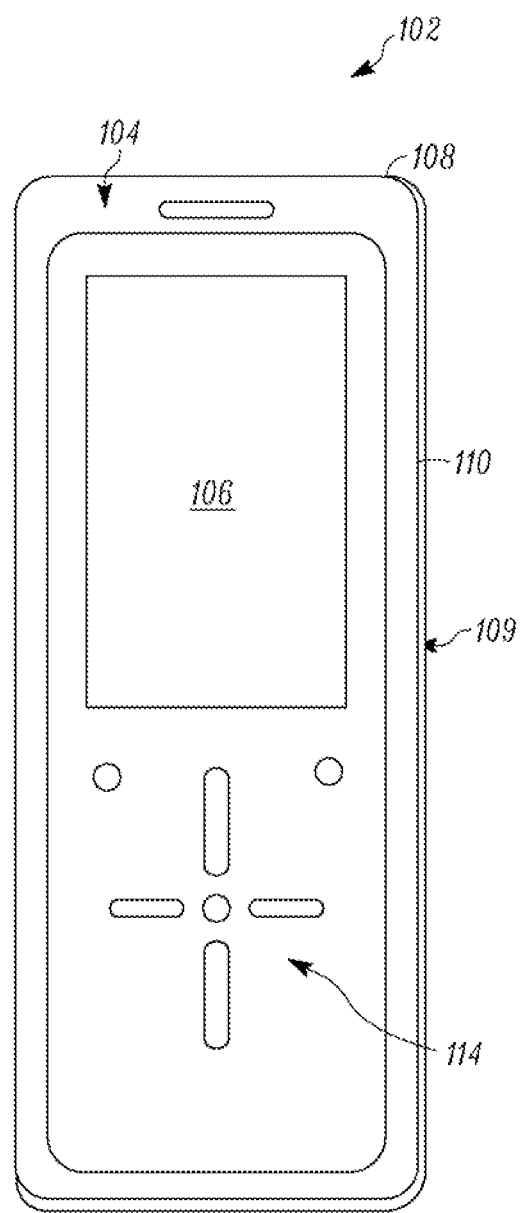
FIG. 1 is a front perspective view of an exemplary electronic device.

An electronic device includes several stacked layers that are individually controllable via a composite driver (or individual drivers) to provide a varied color appearance of at least a portion of the electronic device, such as a front side, where the front side includes an electronic display, such as an LCD (liquid crystal display) screen and/or displayable graphics of a user input component, such as backlit virtual buttons on a touch detecting surface. The stacked layers include an optical shuttering layer and one or more color changing layers, and each layer can be independently controlled by application of a corresponding electric field. The optical shuttering layer can be substantially parallel to the front side of the electronic device and located over at least a portion of the electronic display, with the color changing layers positioned over at least a portion of the optical shuttering layer. The optical shuttering layer can be controlled by a driver to change between a transparent clear state and an opaque state, and each color changing layer can be controlled to change between a transparent clear state and a saturated colored state. Controlling respective optical states of each of these layers enables various color effects on the front side of the device, including a changed colored appearance over at least a portion of the display, while still allowing for normal use of the display without the color effects when desired.

In particular, when the optical shuttering layer and the color changing layer(s) are each in a transparent clear state, then the display can be viewed without a significant distortion effect from these layers, and normal, active operation of the electronic device can occur, and the device has its default appearance. However, the optical shuttering layer can be transitioned from the transparent clear state to an opaque state, such as a solid black color, which provides a uniform background for the color changing layer(s) when viewed from the front side. The one or more color changing layers can be individually controlled by transitioning each to a desired colored state (from clear to partially saturated to fully saturated) in order to display a desired color on one or more portions of the electronic device including over all or a portion of the electronic display and backlit virtual buttons.

In this manner, the front side of the electronic device, including electronic display and virtual buttons, can be differently colored at different times. In some cases, the color can be changed to one of various possible colors, and it can be possible to match the electronic display and virtual buttons to a color and graphics of the housing or a color and graphics of a cover of the electronic device. Having multiple color changing layers allows for each layer to generate a respective desired color when in a colored state while the other color changing layers are in a transparent clear state, and also allows for other colors to be generated from various combinations of two or more color changing layers being in a respective colored state.

Use of low-power optical shuttering and color-changing layers can support coordinated graphical design of the electronic device housing and the electronic display and virtual buttons. These layers can be entirely or partially coextensive with each other and with the front side of the device. Various color effects can be achieved by the relative locations of these layers with respect to each other and with respect to the display or different portions of the display. Also, various additional layers can be included to provide various decorative graphics effects.

Referring now to FIG. 1, an exemplary electronic device 102 is illustrated which can take the form of a mobile phone (as more fully described with respect to FIG. 2) and can include functions such as calling, emailing, texting, image acquisition, and Internet browsing functions, as well as others. In other embodiments, the electronic device can be one of a variety of other devices such as a personal digital assistant or tablet computer, desktop computer or television monitor, remote controller, cordless telephone, microwave over or other household appliance with an electronic control panel, etc. As shown, the electronic device 102 has a front side 104 including an electronic display 106 and a virtual keypad 114. In addition, a housing 108 is provided which (in at least one embodiment) extends along at least a portion of each of the front side 104, a back side 109, and a perimeter 110, to at least partially enclose and protect the internal components of the electronic device 102.

The electronic display 106 can be substantially centered on the front side 104 and can be, for example, a Liquid Crystal Display (LCD) screen utilizing a display backlight 217 (see FIG. 2) and a graphics driver circuit for illuminating and providing graphics on the electronic display 106. The virtual keypad 114 can take various forms such as a touch screen, touchpad, or physical keys (or other touch detecting surface) with displayable graphics including various selection and/or navigation buttons. In some cases, the virtual keypad 114 can include an input backlight 219 (see FIG. 2) for illumination. The display backlight 217 and the input backlight 219 can be comprised of the same light source or multiple light sources, such as one or more Light Emitting Diodes (LEDs) and/or an Electroluminescent (EL) panel. In at least some embodiments, the backlight 217 is a light source that is integral with the electronic display 106, such as an Active Matrix Light Emitting Diode (AMOLED) display. Further, a touch screen or touch-detecting surface can extend beyond the virtual keypad 114 and form a part of the electronic display 106.

Figure 2:
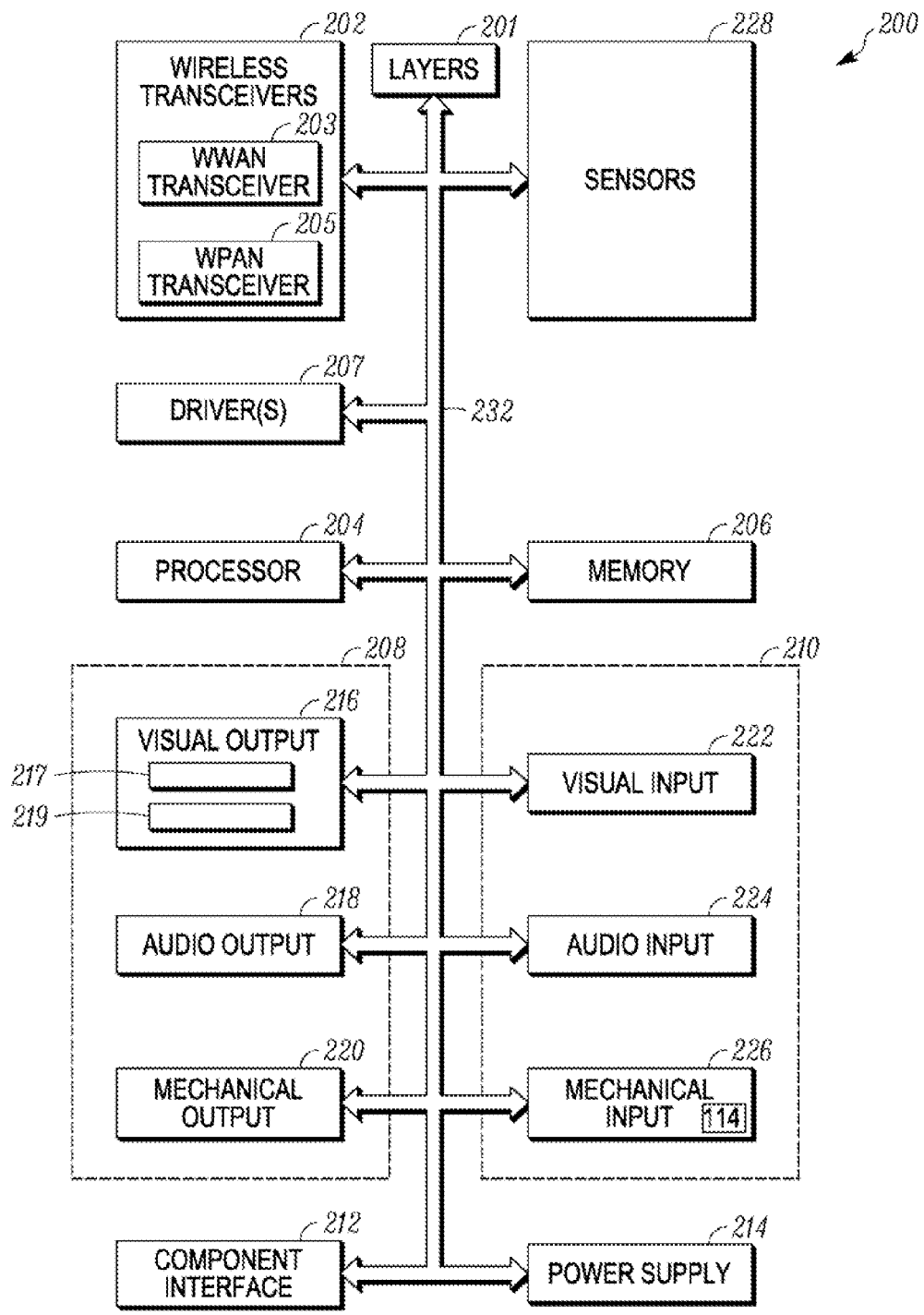
FIG. 2 is a block diagram of the exemplary electronic device of FIG. 1.

Referring to FIG. 2, there is provided a block diagram 200 illustrating exemplary components of the electronic device 102 of FIG. 1. As shown in FIG. 2, these components can include a plurality of layers 201 (as more fully described below with respect to FIG. 3), one or more wireless transceivers 202, a processor 204 (e.g., one or more microprocessors, microcomputers, application-specific integrated circuits, etc.), a driver 207 for controlling an optical state of each of the controllable layers of layers 201 (a composite driver or separate drivers), memory 206, one or more output components 208, and one or more input components 210. The device 102 can also include a component interface 212 to provide a direct connection to auxiliary components or accessories for additional or enhanced functionality; a power supply 214, such as a battery, for providing power to the other internal components while enabling the electronic device 102 to be portable; and one or more sensors 228. All of the components can be coupled to one another, and in communication with one another, by way of one or more of various communication links 232 (e.g., an internal bus).

The layers 201 include various layers as described below with respect to FIG. 3, which can be entirely or partially coextensive with each other and with the front side of the device in order to achieve different colored appearances of the electronic device.

Each of the wireless transceivers 202 utilizes a wireless technology for communication, which can include for example cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth or IEEE 802.11 (a, b, g or n), or other wireless communication technologies such as infra-red technology. In the present embodiment, the wireless transceivers 202 include a cellular transceiver 203 and a wireless local area network (WLAN) transceiver 205, although in other embodiments only one of these types of wireless transceivers (and possibly neither of these types of wireless transceivers and/or additional types of wireless transceivers) is present. It should be understood that, while the present embodiment includes the wireless transceivers 202, each of which can be understood to include both a wireless receiver and a wireless transmitter, in other embodiments the receiver and transmitter for any given type of wireless technology can be distinct components, and/or a receiver for a given type of wireless technology can be present even though a transmitter for that wireless technology is not present, or a transmitter is present while a receiver is not.

By virtue of the use of the wireless transceivers 202, the electronic device 102 is capable of communicating with a variety of external components such as cell towers, access points/hotspots, and other devices. Operation of the wireless transceivers 202 in conjunction with others of the components of the electronic device 102 can take a variety of forms. For example, operation of the wireless transceivers 202 can proceed in a manner in which, upon reception of wireless signals, the components detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208.

Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted. The wireless transceivers 202 convey the modulated communication signals by way of wireless (as well as possibly wired) communication links (not shown) to other devices such as cell towers, access point/hotspots, a remote server, or a variety of other remote devices.

Depending upon the embodiment, the input and output components 208, 210 of the internal components can include a variety of visual, audio and/or mechanical inputs and/or outputs. For example, the output components 208 can include one or more visual output components 216 such as the electronic display 106 (e.g., a backlit liquid crystal display for displaying graphics and/or video), one or more audio output components 218 such as a speaker, alarm, and/or buzzer, and/or one or more mechanical output components 220 such as a vibrating mechanism. Likewise, by example, the input component(s) 210 can include one or more visual input components 222 such as a camera, one or more audio input components 224 such as a microphone, and/or one or more mechanical input components 226 such as a camera lens position sensor, flip sensor, keyboard, keypad, selection button, navigation cluster, touch pad, capacitive sensor, motion sensor, and/or switch. Also, the virtual keypad 114 can include a subset of one or more of the aforementioned input components 210.

Operations that can actuate one or more of the input components 210 can include not only the physical pressing/actuation of buttons or other actuators, but can also include, for example, opening the electronic device, unlocking the device, moving the device to actuate a motion, moving the device to actuate a location positioning system, and operating the device.

Additionally, while in FIG. 2 the input components 210 are shown to be distinct from the output components 208, it should be recognized that in some embodiment one or more components serve both as input component(s) and output component(s). For example, the front side of the electronic device 102 can function as a user interface with touch sensing capability that comprises both one or more of the visual output components 216 (insofar as the display 105 outputs images/graphics) as well as one or more of the mechanical input components 226 (insofar as touch inputs are sensed/actuable by virtual keypad 114 and perhaps electronic display 106 implemented as a touch screen as well).

The sensors 228 can be of various types. The sensors 228 can include, for example, proximity sensors, light detecting sensors, ultrasound and infrared transceivers, touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface of the electronic device 102.

The memory 206 can encompass one or more memory components of any of a variety of forms (e.g., read-only memory, flash memory, random access memory, static random access memory, dynamic random access memory, etc.), and can be used by the processor 204 to store and retrieve data. In some embodiments, the memory 206 (or a portion thereof) can be integrated with the processor 204 (or a portion thereof) in a single component (e.g., a processing component including memory or processor-in-memory (PIM)), albeit such a single component will still typically have distinct portions/sections that perform the different processing and memory functions and that can be considered separate components. The data that is stored by the memory 206 can include, but need not be limited to, operating systems, programs (applications), and informational data. Each operating system includes executable code that controls basic functions of the electronic device 102, such as interaction among the various components mentioned above, communication with external devices via the wireless transceivers 202 and/or the component interface 212, and storage and retrieval of programs and data, to and from the memory 206.

As for programs, each program includes executable code that utilizes an operating system to provide more specific functionality, such as file system service and handling of protected and unprotected data stored in the memory 206. Although many such programs govern standard or required functionality of the electronic device 102, in many cases the programs include applications for simply "apps") governing optional or specialized functionality, which can be provided in some cases by third party vendors unrelated to the electronic device manufacturer.

Finally, with respect to informational data, this is non-executable code or information that can be referenced and/or manipulated by an operating system or program for performing functions of the electronic device 102. Such informational data can include, for example, data that is preprogrammed upon the electronic device 102 during manufacture, or any of a variety of types of information that is uploaded to, downloaded from, or otherwise accessed at servers or other devices with which the electronic device 102 is in communication during its ongoing operation. The electronic device 102 can be programmed such that the processor 204, driver 207, and memory 206 interact with the other components of the electronic device to perform various functions, such as to control the various optical states of a optical shuttering layer and one or more color changing layers (shown in FIG. 3) to allow the color appearance of the device 102 to be changed.

Figure 3:
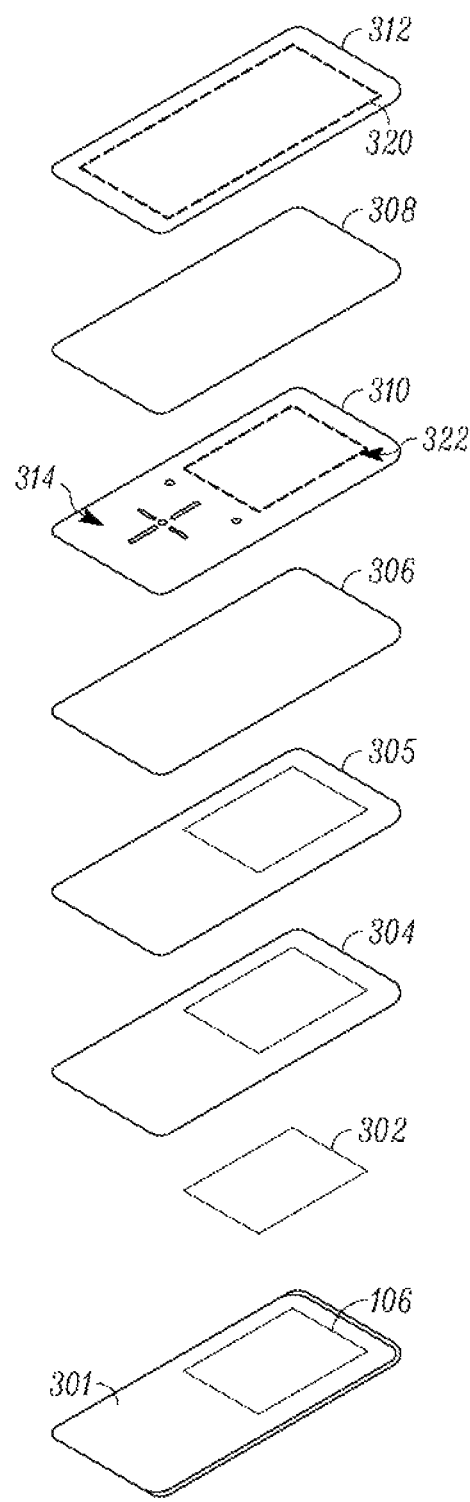
FIG. 3 is a partially exploded view of the front of the electronic device of FIG. 1.

Referring to FIG. 3, the front of the electronic device 102 is shown in an exploded view to illustrate various components and layers 201 of the device which contribute to the ability of the device to change its color appearance. As mentioned, these layers can each extend over all or a portion of a front side or other sides of the device, and need not be coextensive with each other.

Specifically, as shown the electronic device 102 includes a layer 301 supporting the electronic display 106, where the electronic display can be a LCD (liquid crystal display) screen with an associated display backlight 217 (not shown in FIG. 3) for providing illumination. The electronic display 106 is protected from the outside environment by a display lens layer 302, which can include a glass lens of perhaps 0.8 mm thickness positioned over the electronic display 106.

An input sensor layer 304, such as a force-sensing resistor panel, can be provided on top of the electronic display 106 and can be configured to sense mechanical inputs from a user. As shown, the input sensor layer 304 has a cut-out over the electronic display 106, such that the electronic display 106 itself is not operable as a touch screen, although in other embodiments, the sensor layer 304 can extend over all or a portion of the electronic display 106 as well. Layer 304 as shown acts to sense user inputs for the virtual keypad 114, such as a user pushing keys/buttons of displayable graphics. Various other technologies, such as capacitive sensing or mechanical/electronic poppies, can also be used to sense user inputs.

Illumination for the displayable graphics of virtual keypad 114 can be provided by input backlight 219, which can take the form of an electroluminescence (EL) cell lamp layer 305 that is positioned over the input sensor layer 304. Such an EL lamp layer can be very thin, on the order of 0.1 mm. In other embodiments, backlight 219 can take the form of one or more LEDs (light emitting diodes), with or without lightpipes. Further, in other embodiments, the input sensor layer 304 and the EL lamp layer 305 can be combined as a single component.

An optical shuttering layer 306 is positioned at least partially over the EL lamp layer 305. The optical shuttering layer 306 can be transitioned between a transparent clear state and an opaque state (such as a black color opaque state), and vice versa, by the driver 207, such as by controlling the application of an appropriate electric field to electrodes (not shown) associated with the optical shuttering layer. In at least one embodiment, the optical shuttering layer 306 is a polymer-dispersed liquid crystal (PDLC) panel, although other optical shuttering technologies can be utilized such as a Twisted Nematic Liquid Crystal (TNLC) panel.

In particular, a PDLC panel includes micron-sized liquid crystal droplets that are dispersed in a solid polymer matrix. Dichroic dye molecules are added to the liquid crystal droplets to cause a PDLC panel to exhibit the color of the dye when no electric field is applied to the layer. In this colored state, the dye molecules and liquid crystal droplets are randomly arranged and the layer is opaque. This is conceptually a "closed optical shutter" condition, with the PDLC panel serving as a light absorption barrier that substantially prevents light from passing through the optical shuttering layer 306, particularly when the colored state is black. When an electric field of predetermined strength and orientation is applied, the dye molecules and the liquid crystal droplets reorient to allow light to pass through. This is conceptually an "open optical shutter" condition, where the PDLC panel is rendered transparent allowing light to pass through. In this regard, the optical shuttering layer 306, when in the opaque state, can absorb incident light from the front side and prevent light emitted from one or both of the display backlight 217 and the input backlight 219 to pass through.

Although only one optical shuttering layer 306 is illustrated, one or more optical shuttering layers 306 in different locations can be added to provide varied visual effects by controlling each independently. Further, although the optical shuttering layer 306 is primarily discussed as being controllable to an opaque state that is black in color, other colors, such as white can be used to provide other color effects. In addition, by varying the strength of the applied electric field between that required for a transparent clear state and that required for a solid color opaque state, other optical states can be achieved for this layer associated with various levels of transparency, which can also provide other color effects in addition to those described below.

At least one color changing layer 308 can be positioned over the optical shuttering layer 306. The color changing layer 308 can be controlled by the driver 207 to transition between various optical states, such as a transparent clear state and a colored state. In at least one embodiment, the color changing layer 308 is a Cholesteric Liquid Crystal (CLC) panel, although other color changing technologies can also be utilized, such as an electrophoretic panel. In at least one embodiment, the color changing layer 308 has a thickness of about 0.200 millimeters. Similar to the optical shuttering layer 306, the color changing layer 308 utilizes an applied electric field, such as one applied to electrodes (not shown) associated with the color changing layer, to vary the optical state of the color changing layer 308. In this regard, the color changing layer 308 together with the optical shuttering layer can be controlled to vary the appearance of at least a portion of the front side 104 of the electronic device 102. Note that the optical shuttering layer 306 allows for the color changing layer 308 to have a light-absorbing background, which increases color saturation of the color changing layer. In other embodiments, multiple color changing layers can be stacked and individually controlled to provide a plurality of possible colors and color combinations. Specifically, having multiple color changing layers allows for each to generate a respective desired color when in a colored state while the other color changing layers are in a transparent clear state, and also allows for other colors to be generated from various combinations of two or more color changing layers being in a respective colored state. Further, it can be possible to change the transparency amount of each individual color changing layer in accordance with a value of a corresponding applied electric field to achieve a number of different optical states for each color changing layer.

In at least one embodiment, the color changing layer 308 is positioned directly over the optical shuttering layer 306, although in other embodiments, a rear cover layer 310 can be provided between the color changing layer 308 and the optical shuttering layer 306. Further, in other embodiments, the color changing layer 308 can wrap around one or more of the sides and back of the housing to provide to provide a uniform color on more than just the front side of the device.

The rear cover layer 310 can be used to provide displayable graphics 314 including selection keys/buttons for the virtual keypad 114 as well as other graphics such as outlining 322 or other designs, where these displayable graphics 314 can be highlighted or illuminated by the input backlight 219 when desired and made dark when desired, in a known manner. Note that the rear cover layer 310 over the EL layer 305 and input sensor layer 304 allows any graphics of the rear cover layer 310 to be backlit and act as virtual keys, if no virtual keys of this type are desired on the electronic device, then the rear cover layer 310, EL layer 305, and input sensor layer 304 can be removed.

Layers 201 can also include a top cover layer 312 which is generally transparent and which can also include additional displayable graphics. For example, the displayable graphics can take the form of a particular design such as a border (a solid or decorative line 320 or design such as vines or flowers) around the perimeter of the front side or the electronic display 106. These displayable graphics can be for decorative purposes or to simply cover the edges where the layers meet or to cover other portions of the front side, and can be of varying colors, such as black, blue, purple, or aqua to match a color of the housing or a color of the virtual keypad 114 in an inactive state when the color changing layer and optical shuttering layers are transparent, which can be determined by a color of the rear cover layer 310.

In other cases, by utilizing a particular level of transparency and/or color for the design with respect to the other components, other effects can be achieved. For example, the design can be visible across the electronic display 106 and/or across virtual keypad 114 when the display backlight 217 and input backlight 219 are off, yet when the backlights are on, the backlight shining through the top cover layer 312 can render the design virtually invisible to a user. In addition, when the optical shuttering layer 306 is controlled to an opaque state, such as black, the design can be provided with a uniform background for prominent display.

The aforementioned layers 201 can be secured using one or more of various methods known in the art, such as by placing adhesive between the layers. In at least some embodiments, the adhesive is an Optically Clear Adhesive (OCA) with a thickness of about 0.025 millimeters.

As described more fully below, note that because the layers 306, 308, 312 and adhesives over the LCD are clear or can be put into a clear state, the LCD and backlit displayable graphics on layer 310 can be visible when those layers are clear. Further, when the color changing layer 308 and optical shuttering layer 306 over the LCD and any displayable graphics on layer 310 are colored and opaque, respectively, then the underlying LCD and any displayable graphics are not visible (assuming that the EL layer is off).

Referring to FIGS. 4, 5, 6, and 7, the front side 104 of the electronic device 102 is shown to illustrate that control of the optical shuttering layer 306 and the color changing layer 308 to various states, and various configurations of these layers, can act to provide various appearances of the front side 104.

Figure 4:
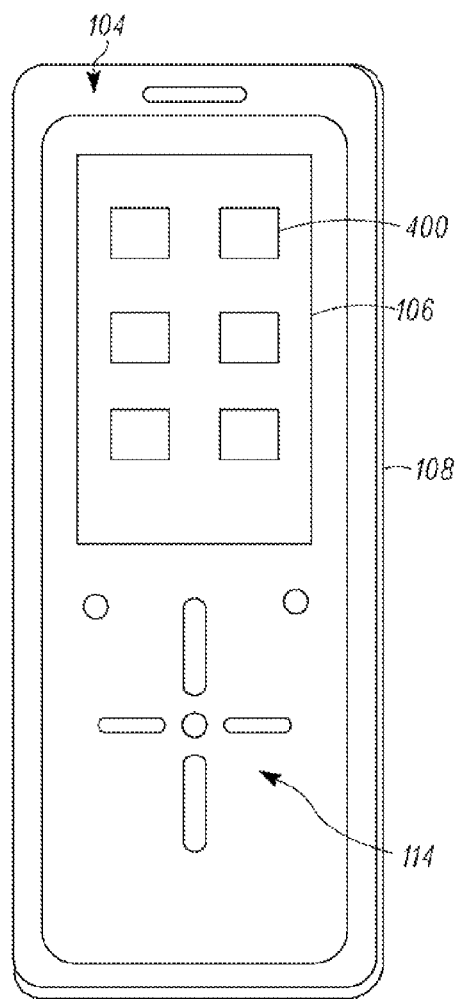
FIG. 4 is a front view of the electronic device of FIG. 1 in an active user state with the color changing layer and the optical shuttering layer in transparent clear states.

In particular, FIG. 4 is meant to illustrate the electronic device 102 in an active user state, with the electronic display 106 and display backlight 217 turned on to display images 400 on the electronic display 106. Additionally, the input backlight 219 is turned on to illuminate the displayable graphics associated with virtual keypad 114. In this case, to allow the electronic display 106 and displayable graphics of virtual keypad 114 to be viewed, the optical shuttering layer 306 and color changing layer 308 are each controlled to be in a transparent clear state. Normal use of the device can occur. While these layers are transparent, if the electronic display 106 and virtual keypad 114 are turned off (e.g., the backlights 217, 219 are turned off), the front side will typically look black or dark gray.

Figure 5:
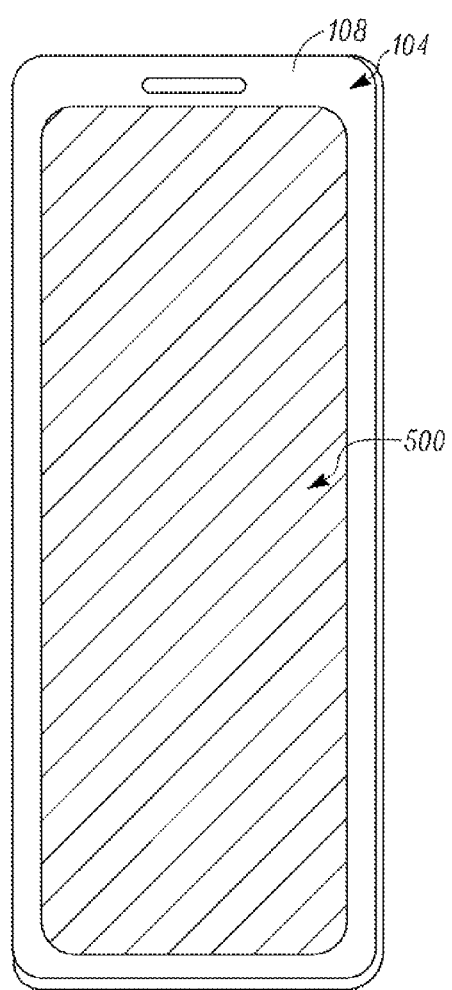
FIG. 5 is a front view of the electronic device of FIG. 1 in a non-active user state with a color changing layer in a colored state and the optical shuttering layer in an opaque state.

Turning to FIG. 5, this illustration is meant to show a colored appearance of the device when the electronic device 102 is in a non-active user state, that is, when it is not desired that the electronic display 106 and the displayable graphics for the virtual keypad 114 be visible. In this case, if the color changing layer 308 is in a colored state and the optical shuttering layer is in an opaque state, then the electronic device 102 can take on the color of the color changing layer 308 as indicated by the hatched lines on the front side 104. In this manner, for example, an appearance of the front side 104 can include a uniform color of a portion 500 corresponding to the extent of color changing layer(s) 308. For example, a uniform color such as purple, green, blue, brown, or any of a variety of other colors is possible, depending on the color of corresponding colored state(s) of one or more of the color changing layers. In some cases, the color of portion 500 can match a paint color of the housing 108.

If the optical shuttering layer 306 is instead in a transparent clear state (or partially transparent state) while the color changing layer 308 is in the fully-saturated colored state, the color appearance of the front side will be a less saturated color. Note that, if portions of the optical shuttering layer 306 were in a transparent clear or partially transparent state while other portions of the optical shuttering layer 306 were in an opaque state, the non-opaque sections would be seen by a viewer as being "shadowed" where the color appearance is less saturated.

Figure 6:
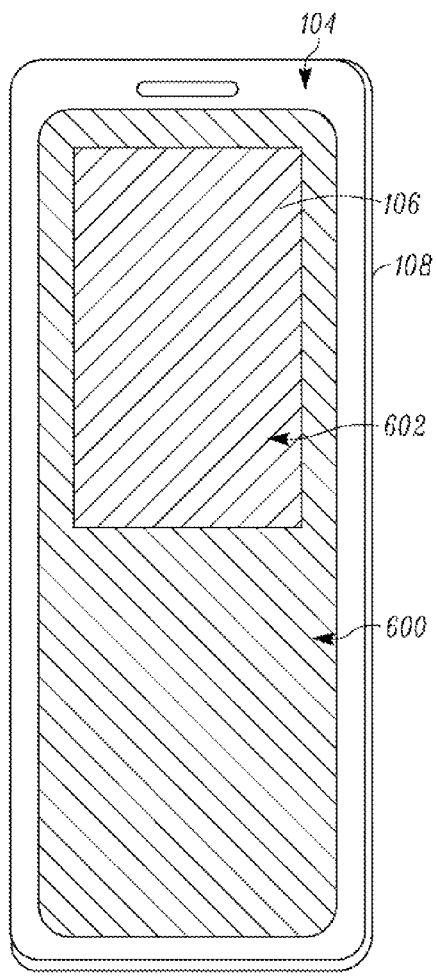
FIG. 6 is a front view of a electronic device similar to that of FIGS. 1-3 in a non-active user state with an optical shuttering layer in an opaque state and a color changing layer in a colored state, and wherein the optical shuttering layer is not co-extensive with the color changing layer and the optical shuttering layer is not over the electronic display screen.

FIG. 6 illustrates an electronic device in a non-active user state when the optical shuttering layer is in an opaque state and a color changing layer is in a colored state, and wherein the optical shuttering layer is not coextensive with the color changing layer, but rather extends over the front side 104 without extending over the display 106, and the color changing layer 308 extends over the front side 104 including the electronic display 106. The optical shuttering layer 306 then provides a uniform background except over the display 106 and the color changing layer provides a changed colored appearance on the front side 104, wherein a more saturated color appears in area 600 as indicated by the hatched lines therein, and a less saturated color appears in area 602. In other words, in this case, there will be a shadow effect over the display 106 while a desired color is provided over the virtual keypad 114.

Figure 7:
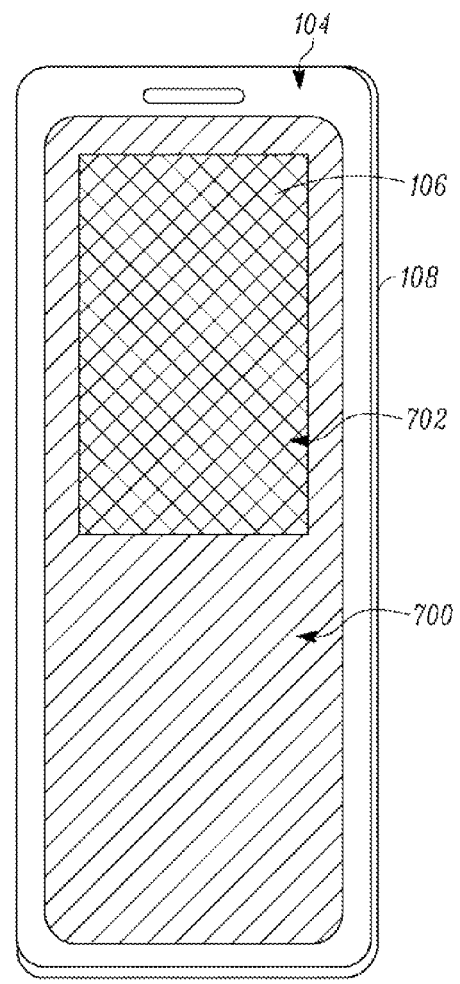
FIG. 7 is a front view of a electronic device similar to that of FIGS. 1-3 in a non-active user state with an optical shuttering layer in an opaque state and a color changing layer in a colored state, and wherein the color changing layer is not co-extensive with the optical shuttering layer and is not over the electronic display screen.

FIG. 7 illustrates an electronic device in a non-active user state when the optical shuttering layer 306 is in an opaque state and the color changing layer 308 is in a colored state, but the color changing layer 308 extends over a portion of the front side without extending over the electronic display 106, and the optical shuttering layer extends over the electronic display 106. The optical shuttering layer 306 then provides a uniform background over the display 106 and the color changing layer provides a changed colored appearance on the front side 104 corresponding to an area of the color changing layer 308, as indicated by the hatched lines in area 700, while the electronic display 106 is black, as indicated by the cross-hatched lines in area 702. In other words, in this case, the color over the virtual keypad 114 can be changed to a desired color while the electronic display 106 remains black in color.

The optical shuttering layer 306 and color changing layer 308 have been discussed primarily with regard to their positioning about a front side 104 of the electronic device 102, although one or both of these layers can also be utilized on other portions of the electronic device 102 as well, such as on the housing 108. In this regard, the overall aesthetic appearance of the electronic device can be substantially altered on demand by using various coloring schemes. For example, the housing 108 can be colored in whole or in part to match or contrast with the coloring chosen on the front side 104. Also, a housing cover (not shown) can be provided that is installable over the housing 108 to provide additional housing colors to match a coloring of the display when in a non-active user state. In addition, as discussed, the color changing layer 308 can include a plurality of color changing layers that are selectively controllable to provide a plurality of colors. The different color changing layers can be overlapping completely or in some portions or can be non-overlapping with each other. Further, a user controlled application can be provided to display selections for a user for various specific colorings on one or more portions of the electronic device 102. In addition, the electronic device 102 can be configured to have a default color scheme such as when the device is turned off. Also, the electronic device 102 can include slidable or foldable portions (not shown), such as a slide-out or flip-open keypad, these additional portions can also include optical shuttering and color changing layers that can be controlled as described above to provide a desired colored appearance to these portions.

It is specifically intended that the present invention not be limited to the embodiments and illustrations contained herein, but include modified forms of those embodiments, including portions of the embodiments and combinations of elements of different embodiments as come within the scope of the following claims.

The invention claimed is:

1. An electronic device comprising:
   a housing;
   a display stack including:
      an electronic display mounted in the housing and viewable from a front side of the electronic device, the electronic display including one of a liquid crystal display and a backlight;
      a first color changing layer disposed between the electronic display and the front side of the electronic device; and
      an optical shuttering layer substantially parallel to the front side of the electronic device, the optical shuttering layer disposed between the first color changing layer and at least a portion of the electronic display;
   a first driver coupled with the optical shuttering layer and configured to control a transition of the optical shuttering layer between a transparent clear state and an opaque state; and
   a second driver coupled with the first color changing layer and configured to control a transition of the first color changing layer between a transparent clear state and a first saturated colored state.

2. The electronic device of claim 1, wherein the first driver and the second driver are a composite driver.

3. The electronic device of claim 1, wherein the electronic display includes a backlight.

4. The electronic display of claim 3, wherein the second driver is configured to, when the backlight is turned off, transition the first color changing layer to a first saturated colored state, such that the front side of the electronic device has a colored appearance due to light that passes through the front side and is reflected from the first color changing layer.

5. The electronic device of claim 3, wherein the optical shuttering layer is positioned between the backlight and the first color changing layer.

6. The electronic device of claim 1, further comprising:
a displayable graphics layer associated with a user input component.

7. The electronic device of claim 1, wherein the optical shuttering layer includes at least one of a polymer dispersed liquid crystal (PDLC) panel and a twisted nematic liquid crystal (TNLC) panel.

8. The electronic device of claim 1, wherein the optical shuttering layer is positioned over at least a portion of the electronic display.

9. The electronic device of claim 1, wherein the first color changing layer includes at least one of a cholesteric liquid crystal panel and an electrophoretic panel.

10. The electronic device of claim 1, further comprising:
a second color changing layer disposed between the electronic display and the front side of the electronic device; and
a third driver for controlling a transition of the second color changing layer between a transparent clear state and a second saturated colored state that is a different color than the first saturated colored state.

11. The electronic device of claim 1, further comprising a rear cover layer positioned under at least a portion of the first color changing layer and which provides one or more user interface button graphics viewable on the front side.

12. The electronic device of claim 1, further comprising:
a touch screen layer positioned over at least a portion of the electronic display.

13. The electronic device of claim 1, further comprising:
a top layer with a graphics pattern.

14. The electronic device of claim 1, wherein the first color changing layer and the optical shuttering layer are coextensive at least over the electronic display.

15. The electronic device of claim 1, wherein the first color changing layer and the optical shuttering layer are not coextensive over the electronic display.

16. An electronic device comprising:
a housing;
a display stack including:
an electronic display mounted in the housing and viewable from a front side of the electronic device;
a cholesteric liquid crystal panel that includes one or more color changing layers, the cholesteric liquid crystal panel disposed between the electronic display and the front side of the electronic device; and
a polymer dispersed liquid crystal panel positioned substantially parallel to the front side of the electronic device, the polymer dispersed liquid crystal panel disposed between the cholesteric liquid crystal panel and at least a portion of the electronic display;
a first driver for controlling the polymer dispersed liquid crystal panel between a transparent clear state and an opaque state; and
a second driver for controlling the cholesteric liquid crystal panel between a transparent clear state and one or more colored states.

17. The electronic device of claim 16, wherein respective states of the polymer dispersed liquid crystal panel and the cholesteric liquid crystal panel are varied to provide a colored appearance on the front side that substantially matches a color of at least a portion of the housing.

18. The electronic device of claim 16, wherein respective states of the polymer dispersed liquid crystal panel and the cholesteric liquid crystal panel are varied to provide a uniformly colored appearance substantially across the front side.

19. The electronic device of claim 16, further comprising:
a touch screen layer positioned over at least a portion of the electronic display.

20. The electronic device of claim 16, wherein a first color changing layer and the polymer dispersed liquid crystal panel are coextensive at least over the electronic display.

* * * * *